United States Patent

Sawachika et al.

[11] 4,071,484
[45] Jan. 31, 1978

[54] PROCESS FOR PREPARING FLEXIBLE FLAME RETARDING POLYURETHANE FOAMS

[75] Inventors: Yasumasa Sawachika, Ashikaga; Hiroshi Kawakami, Tanuma, both of Japan

[73] Assignee: Kohkoku Chemical Industry Co., Ltd., Tokyo, Japan

[21] Appl. No.: 703,219

[22] Filed: July 7, 1976

Related U.S. Application Data

[63] Continuation-in-part of Ser. No. 618,170, Sept. 30, 1975, abandoned, which is a continuation of Ser. No. 464,620, April 26, 1974, abandoned.

[30] Foreign Application Priority Data

Oct. 23, 1973   Japan ................................ 48-119201

[51] Int. Cl.$^2$ ......................................... C08G 18/78
[52] U.S. Cl. .................. 260/2.5 AT; 260/2.5 AM; 260/2.5 AJ
[58] Field of Search ............... 260/2.5 AT, 2.5 AJ, 260/2.5 AM

[56] References Cited

U.S. PATENT DOCUMENTS 3,832,311   8/1974   Windemuth .................. 260/2.5 AT Primary Examiner—C. Warren Ivy
Attorney, Agent, or Firm—Toren, McGeady and Stanger

[57] ABSTRACT

This invention relates to a process for preparing unshrinking, flexible, and flame retarding polyurethane foams from a polyhydroxyl compound, diisocyanate, a blowing agent, a catalyst and other auxiliary agents.

7 Claims, 1 Drawing Figure

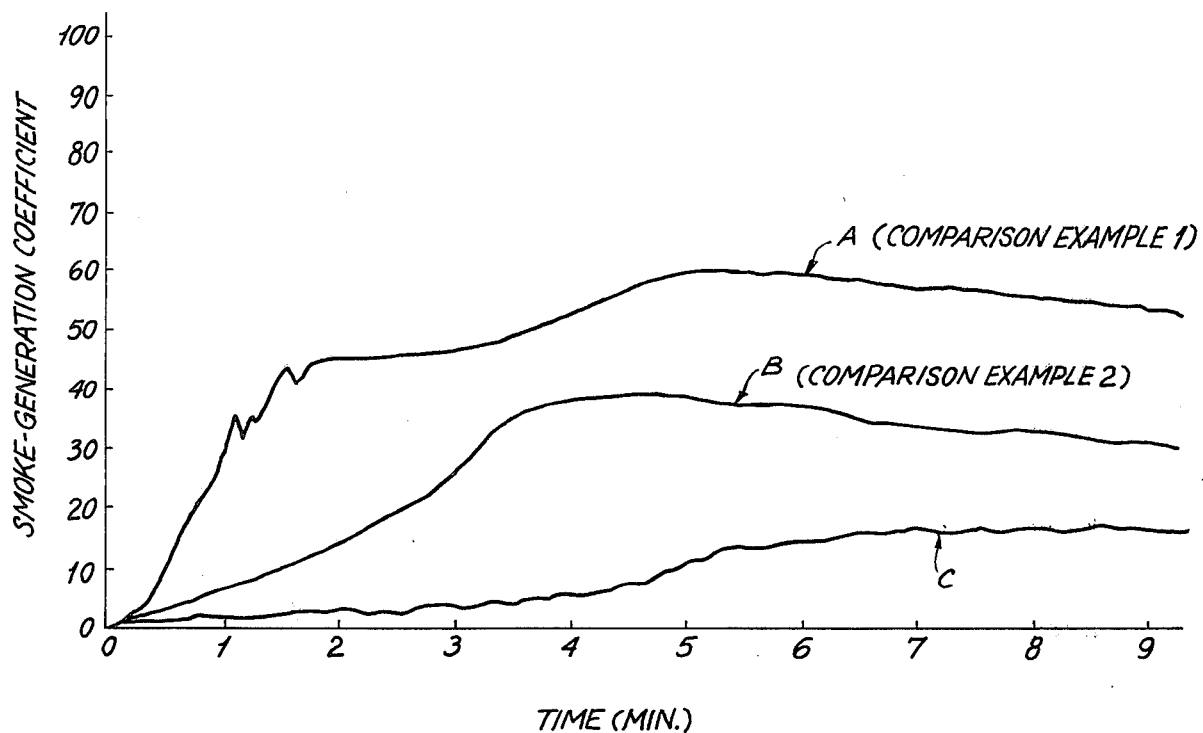

PROCESS FOR PREPARING FLEXIBLE FLAME RETARDING POLYURETHANE FOAMS

This application is a continuation-in-part of our copending application Ser. No. 618,170 filed Sept. 30, 1975 which in turn is a continuation of application Ser. No. 464,620 filed Apr. 26, 1974; both now abandoned.

A process for preparing polyurethane foams from a mixture consisting of polyisocyanate, polyol and some kinds of additives has been so far well known. The polyurethane foams, because of their excellent properties, are used for furnitures, beddings, vehicles and clothes. But their use is limited owing to the inflammability. This fact has encouraged investigations to make polyurethane foams uninflammable. The most frequently used methods for this purpose are those of adding a flame retardant such as phosphorus and halogen compounds. However, flame retardant polyurethane foams which have been made by this process are not free from the difficulty that they evolve much smoke on combustion. In actual fires, much smoke evolved by combustion often involves people to death, and therefore recent tasks on polyurethane foams are to make them not only flame retarding but also low smoke-generating on combustion.

There were in the past processes to make flexible polyurethane foams flame retardant without using compounds of halogen, antimony and phosphorus that evolve much smoke on combustion. For example, in Japanese laid-open patent application Sho 46-197 and Sho 46-3848 flame retardant polyurethane foams were prepared from polyhydroxyl compounds, polyisocyanate, blowing agent and catalyst. The polyhydroxyl compounds having a molecular weight between 1,000 and 10,000 contained at least 2 active hydrogen atoms per molecule of which at least 10% by weight of the hydroxyl groups primary hydroxyl groups, and the polyisocyanate contained a specified amount of urethane or allophanate-modified polyisocyanate, the former being prepared from polyisocyanate and a di- or tri-functional aliphatic hydroxyl compound.

The polyurethane foams thus prepared were self-extinguishing according to ASTM D1692-68. However, the drawbacks of these polyurethane foams were that the cells in the foams were closed and the produced foams were likely to shrink, and that urethane-modified polyisocyanate prepared from di- or tri-functional low molecular weight aliphatic hydroxyl compounds (such as ethyleneglycol, diethyleneglycol, neopentylglycol, 1,5-butanediol and trimethylolpropane) were so unstable as to be readily crystallized at room temperature. The closed cells could be converted open cells by adding a cell-opening agent and/or by applying a mechanical method. But the cell-opener added largely affected the flame retardant and smoke-generation properties and the cells of foam so seriously that fine cellular polyurethane foams of good quality could hardly be prepared. Also the mechanical method is difficult in applying.

In this connection, the present inventors have succeeded, after extensive investigations, in solving the problems of flame retardant polyurethane foams described above, that is shrinking of the foams and the poor stability of modified polyisocyanate compounds, without losing the low smoke generation and the flame retardancy of the foam.

This invention relates to a process for preparing unshrinking flexible and flame retarding polyurethane foams, comprising mixing; (A) diisocyanate mixture which contains 80 to 45% by weight of diisocyanate and 20 to 55% by weight of urethane-modified diisocyanate obtained by reacting (A)-1) one mole of a dihydroxyl aromatic compound selected from the group consisting of 1,2-dihydroxybenzene, 1,3-dihydroxybenzene, 2,2'-dihydroxydiphenyl, 4,4'-dihydroxydiphenyl, 2,2'-dihydroxybenzophenone and 3,3'-dihydroxydiphenylmethane with (A)-2) 4 to 15 moles of diisocyanate at temperature from 80° C to 130° C for 3 to 35 hours, preferably at temperature from 100° C to 130° C for 5 to 25 hours, (B) a polyhydroxyl compound having at least two active hydrogen atoms and the molecular weight between 1,000 and 10,000 at least 10% by weight thereof being primary hydroxyl, (C) a foaming agent, and (D) a catalyst, and foaming and curing the thus obtained foam in the conventional manner.

By limiting the reaction condition between a dihydroxyl aromatic compound and diisocyanate to a temperature from 100° to 130° C for 5 to 10 hours, it is possible to prevent formation of allophanate-modified diisocyanate and yet it is also possible to obtain efficiently diisocyanate mixture containing urethane-modified diisocyanate with remarkably shortened reaction time.

In the reaction mentioned above to form urethane-modified diisocyanate, temperature rise above 130° C results in forming allophanate modified polyisocyanate, and the polyisocyanate containing such allophanate modified polyisocyanate can not provide the unshrinking, flexible and flame retarding polyurethane foams of this invention. On the other hand, if the temperature is lowered below 80° C, the urethane-forming reaction proceeds slowly and it takes an unfavorably long time to form desired urethane-modified diisocyanate.

The polyhydroxyl compounds used in the present invention include those polyols having the molecular weight between 1,000 and 10,000 of which more than 10% of the hydroxyl groups are of primary hydroxyl that are prepared by adding alkylene oxide (such as butylene oxide, propylene oxide and ethylene oxide), as reaction initiator, to polyhydroxyl compounds such as glycol, glycerine, trimethylolpropane and pentaerythrit. If the primary hydroxyl content decreases to 10% by weight or less, polyurethane foams prepared would become burning as decided according to ASTM D1692-68.

Difunctional polyols containing primary hydroxyl groups include poly(oxypropylene)-poly(oxyethylene)-glycol and poly(oxybutylene)-poly(oxyethylene)glycol, and tri-functional polyols include poly(oxypropylene)-poly(oxyethylene)triol and poly(oxybutylene)-poly(oxyethylene)triol. Other polyols which do not contain primary hydroxyl groups may be also used in parallel to the above cited polyols, so long as the primary hydroxyl group content of the mixture exceeds 10% by weight of the total hydroxyl content.

Useful diisocyanates include aliphatic diisocyanate (for example, hexamethylenediisocyanate), cycloaliphatic diisocyanate (such as dicyclohexylmethane diisocyanate) and aromatic diisocyanate (such as tolylenediisocyanate, diphenylmethanediisocyanate, xylylenediisocyanate), and they may be used either alone or in the form of a mixture.

Further all of the diisocyanates mentioned above could be used for the urethane-modified diisocyanate.

Dihydroxy aromatic compound in use for preparing urethane-modified diisocyanate, include 1,2-dihydroxybenzene, 1,3-dihydroxybenzene and 2,4-dihydroxytoluene, 2,2'-dihydroxydiphenyl, 4,4'-dihydroxydiphenyl, 2,2'-dihydroxybenzophenone and 3,3'-dihydroxydiphenylmethane.

The diisocyanate mixture consisting of urethane-modified diisocyanate and diisocyanate can be prepared by the following processes:

In the first process, 1 mole of a dihydroxyl aromatic compound is slowly added to 4 to 15 moles of diisocyanate preheated to 80° to 130° C under stirring and in an atmosphere of a protecting gas (nitrogen, helium) while the temperature is maintained at 80° to 130° C, thus when the urethane forming reaction is completed, the mixture is cooled.

In the second process, 1 mole of a dihydroxyl aromatic compound is added to 4 to 15 moles of diisocyanate at room temperature (20° to 30° C) and the temperature is raised to 80° to 130° C under stirring in an atmosphere of a protecting gas and the temperature is maintained until the urethane forming reaction is completed, then the mixture is cooled.

In the third process, a diisocyanate mixture having a urethane-modified diisocyanate content of 20 to 55% is produced by the mixing in which diisocyanate (for example tolylene diisocyanate) is added to a diisocyanate mixture containing urethane-modified diisocyanate in high content, that is for example, such diisocyanate mixtures preparing from a reaction of 4 to 10 moles of diisocyanate and 1 mole of dihydroxyl aromatic compound as either in the first or second process.

The average time for the urethane forming reaction in preparation of a diisocyanate mixture having a urethane-modified diisocyanate is as follows:

| Reaction temperature | Reaction time | Preferable reaction time |
| --- | --- | --- |
| 80° C | 10 – 30 hrs. | 15 – 20 hrs. |
| 100° C | 5 – 25 hrs. | 10 – 20 hrs. |
| 130° C | 3 – 25 hrs. | 5 – 20 hrs. |

In the second process

| Reaction temperature | Reaction time | Preferable reaction time |
| --- | --- | --- |
| 80° C | 10 – 35 hrs. | 15 – 25 hrs. |
| 100° C | 5 – 30 hrs. | 10 – 25 hrs. |
| 130° C | 3 – 30 hrs. | 5 – 25 hrs. |

In addition, the urethane-modified diisocyanate content in the diisocyanate mixture is 20 to 55% preferably 30 to 50%, by weight. If the urethane-modified diisocyanate content exceeds 55% by weight, the quality of polyurethane foams produced is deteriorated because of lowered reactivity due to a high molecular weight of the urethane-modified diisocyanate and the extremely high viscosity of the diisocyanate mixture that inevitably affects the foam-generation.

If the content becomes less than 20% by weight on the other hand, the foams produced become not self-extinguishing according to the flammability test ASTM D1692-68, and non-shrinking property of the foams can not be achieved.

Besides, a blowing agent and a catalyst are used in preparing polyurethane foams. Water is the main blowing agent and may be applied together with an auxiliary blowing agent such as methylenechloride, trichloromonofluoromethane, trichlorotrifluoroethane and acetone. Catalysts include tertiary amines such as triethylenediamine, triethylamine, N-alkylmorphorine and tetramethylhexamethylenediamine. Other auxiliary agents are surfactant, pigment, dyestuff, filler and so on.

The amount of polyisocyanate should in principle be approximately equal in chemical equivalent to the total amount of active hydrogen atoms present. Since the isocyanate groups react with water as blowing agent, an appropriate amount of polyisocyanate should be added according to the water content.

The present invention provides a process for converting the above mentioned raw materials into polyurethane foams in a general process. For example, an amount of the material containing isocyanate groups is mixed to an approximately equivalent amount of a mixture which contains polyol, catalyst and blowing agent etc. with mechanical or manual operation, and the mixture is agitated continuously or not continuously with an agitator, to obtain polyurethane foams. The obtained polyurethane foams are cured by a conventional method, for example at a temperature between 10° and 40° C for 24 hours, or in an oven at a temperature between 80° and 120° C for 10 to 60 minutes. To prepare continuously the polyurethane foams in a large scale, a foaming machine could be employed with efficiency.

Low smoke-generating, flame retardant and non-shrinking polyurethane foams could be provided by the process of this invention. Namely, polyurethane foams could be prepared which are self-extinguishing according to the flammability test ASTM D1692-68 and having extremely small smoke-generation coefficient as defined in JIS A1321.

In the followings the present invention will be explained using examples.

EXAMPLE 1

1. Preparation of diisocyanate mixture

110 Grams (1 mole) of 1,3-dihydroxybenzene was gradually added at 130° C to 2180g (12.5 moles) of a 80/20 isomeric mixture of 2,4- and 2,6-tolylenediisocyanates and the temperature was maintained at the same level for 8 hours in a protecting atmosphere of nitrogen, to continue stirring. Then the mixture was cooled. The urethane formation reaction was considered completed because the isocyanate group content of the mixture was approximately equal to the theoretical value (42.3%). Properties of the diisocyanate mixture obtained were as follows:

| | |
| --- | --- |
| Isocyanate group content | 42.3% |
| Viscosity | 500 cps/25° C |
| Urethane-modified diisocyanate content | 20% by weight |
| 2) Producing polyurethane foam | |
| Polyol (glycerine base, OH value 25, molecular weight 6,000, primary hydroxyl groups 60% by weight) | 100 parts |
| Water | 3.5 |
| Triethylenediamine | 0.3 |
| Triethylamine | 0.3 |
| Silicone oil surfactant | 1.0 |
| Diisocyanate mixture | 43.0 |

A mixture consisting of the above components was vigorously agitated with a small stirrer for about 7 seconds to allow free rise of foams and sufficiently cured at temperature for 100° to 110° C for 20 minutes in the oven, to obtain a mass of polyurethane foam. The foam obtained was a non-shrinking microcellular polyurethane foam containing few closed cells. Properties of the foam are shown in Table 1.

EXAMPLE 2

1. Preparation of diisocyanate mixture

100 Grams (1 mole) of 1,3-dihydroxybenzene was gradually added at 130° C to 1417g (8.1 moles) of an isomeric mixture of 2,4- and 2,6-tolylene-diisocyanates and the temperature was maintained at the same level for 8 hours in a protecting atmosphere of nitrogen, to continue stirring. Then the mixture was cooled. The urethane formation reaction was considered completed because the isocyanate group content of the mixture was approximately equal to the theoretical value (39.3%). Properties of the diisocyanate mixture were as follows:

| | |
|---|---|
| Isocyanate group content | 39.3% |
| Viscosity | 1090 cps/25° C |
| Urethane-modified diisocyanate content | 30% by weight |
| 2) Producing polyurethane foam | |
| Polyol (the same as in Example 1) | 100 parts |
| Water | 3.5 |
| Triethylenediamine | 0.3 |
| Triethylamine | 0.3 |
| Silicone oil surfactant | 1.0 |
| Diisocyanate mixture | 46.3 |

A mixture consisting of the above components was vigorously agitated with a small stirrer for about 7 seconds to allow free rise of foams and sufficiently cured at temperature from 100° to 110° C for 20 minutes in the oven, to obtain a mass of polyurethane foam. This foam obtained was a non-shrinking microcellular polyurethane foam containing few closed cells. Properties of the foam are shown in Table 1.

EXAMPLE 3

1. Preparation of diisocyanate mixture

110 Grams (1 mole) of 1,3-dihydroxybenzene was gradually added at 130° C to 1,044g (6 moles) of a 80/20 isomeric mixture of 2,4- and 2,6-tolylene-diisocyanates and the temperature was maintained at the same level for 10 hours in a protecting atmosphere of nitrogen, to continue stirring. Then the mixture was cooled. The urethane formation reaction was considered completed because the isocyanate group content of the mixture was approximately equal to the theoretical value (36.4%). Properties of the diisocyanate mixture obtained were as follows:

| | |
|---|---|
| Isocyanate group content | 36.4% |
| Viscosity | 2380 cps/25° C |
| Urethane-modified diisocyanate content | 40% by weight |
| 2) Producing polyurethane foam | |
| Polyol (the same as in Example 1) | 100 parts |
| Water | 3.5 |
| Treithylenediamine | 0.3 |
| Triethylamine | 0.3 |
| Silicone oil surfactant | 1.0 |
| Urethane-modified polyisocyanate mixture | 50.0 |

A mixture consisting of above components was vigorously agitated with a small stirrer for about 7 seconds to allow free rise of foams and sufficiently cured at temperature from 100° to 110° C for 20 minutes in the oven, to obtain a mass of polyurethane foam. The foam obtained was a non-shrinking microcellular polyurethane foam containing few closed cells. Properties of the foam are shown in Table 1.

The smoke-generation coefficient was 17 as determined by JIS A1321. As is seen in the figure (Curve C), this is a value smaller by far than that of previous flame retardant foam (with a smoke-generation coefficient 60) in Comparison Example 1 (Curve A in the figure).

EXAMPLE 4

1. Preparation of diisocyanate mixture

110 Grams (1 mole) of 1,3-dihydroxybenzene was gradually added at 130° C to 723g (4.2 moles) of a 80/20 isomeric mixture of 2,4- and 2,6-tolylene-diisocyanates and the temperature was maintained at the same level for 10 hours in a protecting atmosphere of nitrogen, to continue stirring. Then the mixture was cooled. The urethane formation reaction was considered completed because the isocyanate group content of the mixture was approximately equal to the theoretical value (31.8%). Properties of the diisocyanate mixture obtained were as follows:

| | |
|---|---|
| Isocyanate group content | 31.8% |
| Viscosity | 8900 cps/25° C |
| Urethane-modified diisocyanate content | 55% by weight |
| 2) Producing polyurethane foam | |
| Polyol (the same as in Example 1) | 100 parts |
| Water | 3.5 |
| Triethylenediamine | 0.3 |
| Triethylamine | 0.3 |
| Silicone oil surfactant | 1.0 |
| Diisocyanate mixture | 57.2 |

A mixture consisting of the above components was vigorously agitated with a small stirrer for about 7 seconds to allow free rise of foams and sufficiently cured at temperature from 100° to 110° C for 20 minutes in the oven, to obtain a mass of polyurethane foam. The foam obtained was a non-shrinking microcellular polyurethane foam containing few closed cells. Properties of the foam are shown in Table 1.

EXAMPLE 5

1. Preparation of diisocyanate mixture

110 Grams (1 mole) of 1,3-dihydroxybenzene was gradually added at 80° C to 1044g (6 moles) of a 80/20 isomeric mixture of 2,4- and 2,6-tolylene-diisocyanates and the temperature was maintained at the same level for 17 hours in a protecting atmosphere of nitrogen, to continue stirring. Then the mixture was cooled. The urethane formation reaction was considered completed because the isocyanate group content of the mixture was approximately equal to the theoretical value (36.4%). Properties of the diisocyanate mixture obtained were as follows:

| | |
|---|---|
| Isocyanate group content | 36.4% |
| Viscosity | 2380 cps/25° C |
| Urethane-modified diisocyanate content | 40% by weight |
| 2) Producing polyurethane foam | |
| Polyol (the same as in Example 1) | 100 parts |
| Water | 3.5 |
| Triethylenediamine | 0.3 |
| Triethylamine | 0.3 |
| Silicone oil surfactant | 1.0 |
| Diisocyanate mixture | 50.1 |

A mixture consisting of above components was vigorously agitated with a small stirrer for about 7 seconds to allow free rise of foams and sufficiently cured at temperature from 100° to 110° C for 20 minutes in the oven, to obtain a mass of polyurethane foam. The foam obtained was a non-shrinking microcellular polyurethane foam containing few closed cells. Properties of the foam are shown in Table 1.

EXAMPLE 6

1. Preparation of diisocyanate mixture

110 Grams (1 mole) of 1,3-dihydroxybenzene was gradually added at 100° C to 1044g (6 moles) of a 80/20 isomeric mixture of 2,4- and 2,6-tolylene-diisocyanates and the temperature was maintained at the same level for 13 hours in a protecting atmosphere of nitrogen, to continue stirring. Then the mixture was cooled. The urethane formation reaction was considered completed because the isocyanate group content of the mixture was approximately equal to the theoretical value (36.4%). Properties of the diisocyanate mixture obtained were as follows:

| | |
|---|---|
| Isocyanate group content | 36.4% |
| Viscosity | 2360 cps/25° C |
| Urethane-modified diisocyanate content | 40% by weight |
| 2) Producing polyurethane foam | |
| Polyol (the same as in Example 1) | 100 parts |
| Water | 3.5 |
| Triethylenediamine | 0.3 |
| Triethylamine | 0.3 |
| Silicone oil surfactant | 1.0 |
| Diisocyanate mixture | 50.1 |

A mixture consisting of above components was vigorously agitated with a small stirrer for about 7 seconds to allow free rise of foams and sufficiently cured at temperature from 100° to 110° C for 20 minutes in the oven, to obtain a mass of polyurethane foam. The foam obtained was a non-shrinking microcellular polyurethane foam containing few closed cells. Properties of the foam are shown in Table 1.

EXAMPLE 7

1. Preparation of diisocyanate mixture

110 Grams (1 mole) of 1,3-dihydroxybenzene was gradually added at 120° C to 1044g (6 moles) of a 80/20 isomeric mixture of 2,4- and 2,6-tolylene-diisocyanates and the temperature was maintained at the same level for 10 hours in a protecting atmosphere of nitrogen, to continue stirring. Then the mixture was cooled. The urethane formation reaction was considered completed because the isocyanate group content of the mixture was approximately equal to the theoretical value (36.4%). Properties of the diisocyanate mixture obtained were as follows:

| | |
|---|---|
| Isocyanate group content | 36.4% |
| Viscosity | 2390 cps/25° C |
| Urethane-modified diisocyanate content | 40% by weight |
| 2) Producing polyurethane foam | |
| Polyol (the same as in Example 1) | 100 parts |
| Water | 3.5 |
| Triethylenediamine | 0.3 |
| Triethylamine | 0.3 |
| Silicone oil surfactant | 1.0 |
| Diisocyanate content | 50.1 |

A mixture consisting of above components was vigorously agitated with a small stirrer for about 7 seconds to allow free rise of foams and sufficiently cured at temperature from 100° to 110° C for 20 minutes in the oven, to obtain a mass of polyurethane foam. The foam obtained was a non-shrinking microcellular polyurethane foam containing few closed cells. Properties of the foam are shown in Table 1.

EXAMPLE 8

1. Preparation of diisocyanate mixture

110 Grams (1 mole) of 1,2-dihydroxybenzene was gradually added at 130° C to 1044g (6 moles) of a 80/20 isomeric mixture of 2,4- and 2,6-tolylene-diisocyanates and the temperature was maintained at the same level for 17 hours in a protecting atmosphere of nitrogen, to continue stirring. Then the mixture was cooled. The urethane formation reaction was considered completed because the isocyanate group content of the mixture was approximately equal to the theoretical value (36.4%). Properties of the diisocyanate mixture obtained were as follows:

| | |
|---|---|
| Isocyanate group content | 36.4% |
| Viscosity | 2500 cps/25° C |
| Urethane-modified diisocyanate content | 40% by weight |
| 2) Producing polyurethane foam | |
| Polyol (the same as in Example 1) | 100 parts |
| Water | 3.5 |
| Triethylenediamine | 0.3 |
| Triethylamaine | 0.3 |
| Silicone oil surfactant | 1.0 |
| Diisocyanate mixture | 50.1 |

A mixture consisting of above components was vigorously agitated with a small stirrer for about 7 seconds to allow free rise of foams and sufficiently cured at temperature from 100° to 110° C for 20 minutes in the oven, to obtain a mass of polyurethane foam. The foam obtained was a non-shrinking microcellular polyurethane foam containing few closed cells. Properties of the foam are shown in Table 1.

EXAMPLE 9

1. Preparation of diisocyanate mixture

124 Grams (1 mole) of 2,4-dihydroxytoluene was gradually added at 130 C to 1056g (6.1 moles) of a 80/20 isomeric mixture of 2,4- and 2,6-tolylene-diisocyanates and the temperature was maintained at the same level for 13 hours in a protecting atmosphere of nitrogen, to continue stirring. Then the mixture was cooled. The urethane formation reaction was considered completed because the isocyanate group content of the mixture was approximately equal to the theoretical value (36.1%). Properties of the diisocyanate mixture obtained were as follows:

| | |
|---|---|
| Isocyanate group content | 36.1% |
| Viscosity | 2300 cps/25° C |
| Urethane-modified diisocyanate content | 40% by weight |
| 2) Producing polyurethane foam | |
| Polyol (the same as in Example 1) | 100 parts |
| Water | 3.5 |
| Triethylenediamine | 0.3 |
| Triethylamine | 0.3 |
| Silicone oil surfactant | 1.0 |
| Diisocyanate mixture | 50.4 |

A mixture consisting of above components as vigorously agitated with a small stirrer for about 7 seconds to allow free rise of foams and sufficiently cured at temperature from 100° to 110° C for 20 minutes in the oven, to obtain a mass of polyurethane foam. The foam obtained was a non-shrinking microcellular polyurethane foam containing few closed cells. Properties of the foam are shown in Table 1.

EXAMPLE 10

1. Preparation of diisocyanate mixture

186 Grams (1 mole) of 2,2-dihydroxydiphenyl was gradually added at 130° C to 1149g (6.6 moles) of a 80/20 isomeric mixture of 2,4- and 2,6-tolylenediisocyanates and the temperature was maintained at the same level for 12 hours in a protecting atmosphere of nitrogen, to continue stirring. Then the mixture was cooled. The urethane formation reaction was considered completed because the isocyanate group content of the mixture was approximately equal to the theoretical value (35.3%). Properties of the diisocyanate mixture obtained were as follows:

| Isocyanate group content | 35.3% |
| --- | --- |
| Viscosity | 1000 cps/25° C |
| Urethane-modified diisocyanate content | 40% by weight |
| 2) Producing polyurethane foam | |
| Polyol (the same as in Example 1) | 100 parts |
| Water | 3.5 |
| Triethylenediamine | 0.3 |
| Triethylamine | 0.3 |
| Silicone oil surfactant | 1.0 |
| Diisocyanate mixture | 51.6 |

A mixture consisting of above components was vigorously agitated with a small stirrer for about 7 seconds to allow free rise of foams and sufficiently cured at temperature from 100° to 110° C for 20 minutes in the oven, to obtain a mass of polyurethane foam. The foam obtained was a non-shrinking microcellular polyurethane foam containing few closed cells. Properties of the foam are shown in Table 1.

EXAMPLE 11

1. Preparation of diisocyanate mixture

186 Grams (1 mole) of 4,4'-dihydroxydiphenyl was gradually added at 130° C to 1149g (6.6 moles) of a 80/20 isomeric mixture of a 2,4- and 2,6-tolylene-diisocyanates and the temperature was maintained at the same level for 9 hours in a protecting atmosphere of nitrogen, to continue stirring. Then the mixture was cooled. The urethane formation reaction was considered completed because the isocyanate group content of the mixture was approximately equal to the theoretical value (35.3%). Properties of the diisocyanate mixture obtained were as follows:

| Isocyanate group content | 35.3% |
| --- | --- |
| Viscosity | 1100 cps/25° C |
| Urethane-modified diisocyanate content | 40% by weight |
| 2) Producing polyurethane foam | |
| Polyol (the same as in Example 1) | 100 parts |
| Water | 3.5 |
| Triethylenediamine | 0.3 |
| Triethylamine | 0.3 |
| Silicone oil surfactant | 1.0 |
| Diisocyanate mixture | 51.6 |

A mixture consisting of above components was vigorously agitated with a small stirrer for about 7 seconds to allow free rise of foams and sufficiently cured at temperature from 100° to 110° C for 20 minutes in the oven, to obtain a mass of polyurethane foam. The foam was non-shrinking microcellular polyurethane foam containing few closed cells. Properties of the foam are shown in Table 1.

EXAMPLE 12

1. Preparation of diisocyanate mixture

214 Grams (1 mole) of 2,2'-dihydroxybenzophenone was gradually added at 130° C to 1191g (6.8 moles) of a 80/20 isomeric mixture of 2,4- and 2,6-tolylene-diisocyanates and the temperature was maintained at the same level for 14 hours in a protecting atmosphere of nitrogen, to continue stirring. Then the mixture was cooled. The urethane formation reaction was considered completed because the isocyanate group content of the mixture was approximately equal to the theoretical value (34.9%).

Properties of the diisocyanate mixture obtained were as follows:

| Isocyanate group content | 34.9% |
| --- | --- |
| Viscosity | 700 cps/25° C |
| Urethane-modified diisocyanate contetn | 40% by weight |
| 2) Producing polyurethane foam | |
| Polyol (the same as in Example 1) | 100 parts |
| Water | 3.5 |
| Triethylenediamine | 0.2 |
| Triethylamine | 0.5 |
| Silicone oil surfactant | 1.0 |
| Diisocyanate mixture | 52.1 |

A mixture consisting of above components was vigorously agitated with a small stirrer for about 7 seconds to allow free rise of foams and sufficiently cured at temperature from 100° to 110° C for 20 minutes in the oven, to obtain a mass of polyurethane foam. The foam was a non-shrinking microcellular polyurethane foam containing few closed cells. Properties of the foam are shown in Table 1.

EXAMPLE 13

1. Preparation of diisocyanate mixture

198 Grams (1 mole) of 3,3'-dihydroxydiphenylmethane was gradually added at 130° C to 1167g (6.7 moles) of a 80/20 isomeric mixture of 2,4- and 2,6-tolylene-diisocyanates, and the temperature was maintained at the same level for 5 hours in a protecting atmosphere of nitrogen, to continue stirring. Then the mixture was cooled. The urethane formation reaction was considered completed because the isocyanate group content of the mixture was approximately equal to the theoretical value (35.1%). Properties of the urethane-modified diisocyanate mixture obtained were as follows:

| Isocyanate group content | 35.1% |
| --- | --- |
| Viscosity | 800 cps/25° C |
| Urethane-modified diisocyanate content | 40% by weight |
| 2) Producing polyurethane foam | |
| Polyol (the same as in Example 1) | 100 parts |
| Water | 3.5 |
| Triethylenediamine | 0.3 |
| Triethylamine | 0.3 |
| Silicone oil surfactant | 1.0 |
| Diisocyanate mixture | 51.9 |

A mixture consisting of above components was vigorously agitated with a small stirrer for about 7 seconds to allow free rise of foams and sufficiently cured at temperature from 100° to 110° C for 20 minutes in the oven, to obtain a mass of polyurethane foam. The foam was a non-shrinking microcellular polyurethane foam containing few closed cells. Properties of the foam are shown in Table 1.

For the sake of comparison, a process will be described for preparing previous flame retardant polyurethane foams which involve adding flame retardant.

COMPARISON EXAMPLE 1

| Polyol (Glycerine base, OH value 55, molecular weight 3,000) | 100 parts |
| --- | --- |
| Water | 3.5 |
| Stannous octoate | 0.6 |
| Triethyldiamine | 0.1 |
| N-methylmorphorine | 1.0 |
| Silicone oil surfactant | 1.5 |
| Tris($\beta$-chloroethyl)phosphate | 13.0 |

-continued

| | |
|---|---|
| Tolylenediisocyanate (80/20) | 45.0 |

A mixture consisting of the above components was vigorously stirred with a small stirrer for about 7 seconds to allow free rise of foams and sufficiently cured at temperature from 100° to 110° C for 20 minutes in the oven, to obtain a mass of polyurethane foam. Properties of the foam are shown in Table 1.

Further, the smoke-generation coefficient as determined by JIS A1321 was 60 (cf. Curve A in the figure).

The following Comparison Example described the case where a diisocyanate mixture is used of which the urethane-modified diisocyanate content is outside the claimed range.

COMPARISON EXAMPLE 2

1. Preparation of diisocyanate mixture

110 Grams (1 mole) of 1,3-dihydroxybenzene was gradually added at 130° C to 4470g (25.7 moles) of a 80/20 isomeric mixture of 2,4- and 2,6-tolylenediisocyanates, and the temperature was maintained for 6 hours in a protecting atmosphere of nitrogen to continue stirring. Then the mixture was cooled. The urethane formation reaction was considered completed because the isocyanate group content of the mixture was approximtely equal to the theoretical value (45.3%). Properties of the diisocyanate mixture obtained were as follows:

| | |
|---|---|
| Isocyanate group content | 45.3% |
| Viscosity | 170 cps/25° C |
| Urethane-modified diisocyanate content | 10% by weight |
| 2) Producing polyurethane foam | |
| Polyol (the same as in Example 1) | 100 parts |
| Water | 3.5 |
| Triethylenediamine | 0.3 |
| Triethylamine | 0.3 |
| Silicone oil surfactant | 1.0 |
| Diisocyanate mixture | 40.2 |

A mixture consisting of above components was vigorously agitated with a small stirrer for about 7 seconds to allow free rise of foams, and sufficiently cured at temperature from 100° to 110° C for 20 minutes in the oven, to obtain a mass of polyurethane foam. Properties are shown in Table 1. The smoke-generation coefficient as determined by JIS A1321 was 39 (See Curve B in the figure).

COMPARISON EXAMPLE 3

1. Preparation of diisocyanate mixture

110 Grams (1 mole) of 1,3-dihydroxybenzene was gradually added at 130° C to 595g (3.4 moles) of a 80/20 isomeric mixture of 2,4- and 2,6-tolylenediisocyanates, and the temperature was maintained at the same level for 12 hours in a protecting atmosphere of nitrogen, to continue stirring. The mixture was cooled. The urethane formation reaction was considered completed because the isocyanate group content was approximately equal to the theoretical value (28.8%). Properties of the diisocyanate mixture obtained were as follows:

| | |
|---|---|
| Isocyanate group content | 28.8% |
| Viscosity | 20000 cps/25° C |
| Urethane-modified diisocyanate content | 65% by weight |
| 2) Producing polyurethane foam | |
| Polyol (the same as in Example 1) | 100 parts |
| Water | 3.5 |
| Triethylenediamine | 0.3 |
| Triethylamine | 0.3 |
| Silicone oil surfactant | 1.0 |
| Diisocyanate mixture | 63.2 |

A mixture consisting of above components was vigorously agitated with a small stirrer for about 7 seconds to allow free rise of foams, and sufficiently cured at temperature from 100° to 110° C for 20 minutes in the oven. However, polyurethane foam was not obtained in a sufficient mass. Physical properties of the foam are shown in Table 1.

Physical properties, that is hardness, tensile strength, elongation and tear strength, were examined by ASTM D1564-71.

Table 1

| | Physical Properties of the Foams | | | | | | | |
|---|---|---|---|---|---|---|---|---|
| | Comparison Example 1 | Comparison Example 2 | Example 1 | Example 2 | Example 3 | Example 4 | Comparison Example 3 | Example 5 |
| Density, lb/ft³ | 2.1 | 1.9 | 2.0 | 2.1 | 2.1 | 2.3 | 2.4 | 2.1 |
| 25 ILD, lb/50 in² | 22 | 9 | 11 | 16 | 20 | 29 | — | 20 |
| Tensile strength, lb/in² | 15.6 | 10.2 | 11.4 | 13.5 | 15.1 | 14.1 | — | 15.0 |
| Elongation, % | 180 | 160 | 140 | 120 | 120 | 100 | — | 120 |
| Tear strength, lb/in ASTM 1692-68 | 3.3 | 1.7 | 1.7 | 1.9 | 2.0 | 1.8 | — | 2.0 |
| Average distance of combustion, mm | 70 | — | 87 | 53 | 46 | 44 | 40 | 45 |
| Average time for extinguishment, sec. | 50 | — | 45 | 30 | 27 | 25 | 20 | 25 |
| Combustion speed, mm/min. | 84 | 118 | 116 | 106 | 102 | 106 | 120 | 108 |
| Judgment JIS A1321 | SE | B | SE | SE | SE | SE | SE | SE |
| Smoke-generation coefficient | 60 | 39 | 22 | 18 | 17 | 19 | 25 | 16 |

| | Example 6 | Example 7 | Example 8 | Example 9 | Example 10 | Example 11 | Example 12 | Example 13 | Remarks |
|---|---|---|---|---|---|---|---|---|---|
| Density, lb/ft³ | 2.1 | 2.1 | 2.1 | 2.1 | 2.2 | 2.2 | 2.2 | 2.2 | |
| 25 ILD, lb/50 in² | 20 | 20 | 20 | 21 | 19 | 20 | 23 | 20 | According to ASTM D1564-71 |
| Tensile strength, lb/in² | 15.1 | 15.1 | 13.9 | 14.5 | 14.9 | 15.1 | 15.7 | 14.7 | |
| Elongation, % | 120 | 120 | 120 | 110 | 140 | 140 | 130 | 140 | |
| Tear strength, lb/in ASTM 1692-68 | 1.9 | 2.0 | 2.0 | 2.1 | 1.8 | 1.8 | 1.9 | 1.9 | |
| Average distance of combustion, mm | 40 | 45 | 41 | 46 | 52 | 50 | 49 | 55 | |
| Average time for extinguishment, sec. | 23 | 27 | 24 | 26 | 27 | 26 | 25 | 29 | |

Table 1-continued

| Physical Properties of the Foams | | | | | | | | |
|---|---|---|---|---|---|---|---|---|
| Combustion speed, mm/min. | 104 | 100 | 102 | 106 | 116 | 115 | 118 | 114 |
| Judgment JIS A1321 | SE | SE | SE | SE | SE | SE | SE | SE |
| Smoke-generation coefficient | 17 | 17 | 18 | 17 | 21 | 19 | 17 | 23 |

What is claimed is:

1. A process for preparing unshrinking flexible and flame retarding polyurethane foams, comprising mixing;
    A. diisocyanate mixture which contains 80 to 45% by weight of diisocyanate and 20 to 55% by weight of urethane-modified diisocyanate obtained by reacting
    A-1. one mole of a dihydroxyl aromatic compound selected from the group consisting of 1,2-dihydroxybenzene, 1,3-dihydroxybenzene, 2,4-dihydroxytoluene, 2,2'-dihydroxydiphenyl, 4,4'-dihydroxydiphenyl, 2,2'-dihydroxybenzophenone and 3,3'-dihydroxydiphenylmethane with
    A-2. 4 to 15 moles of diisocyanate at a temperature from 80° C to 130° C for 3 to 35 hours
    B. a polyhydroxyl compound having at least two active hydrogen atoms and a molecular weight between 1000 and 10000, at least 10% by weight thereof being primary hydroxyl,
    C. a foaming agent, and
    D. a catalyst, and foaming and curing the thus obtained foam in the conventional manner.

2. A process according to claim 1, wherein the diisocyanate is an aliphatic diisocyanate.

3. A process according to claim 1, wherein the diisocyanate is a cycloaliphatic diisocyanate.

4. A process according to claim 1, wherein the diisocyanate is an aromatic diisocyanate.

5. A process according to claim 1, wherein the diisocyanate is a mixture of more than two aliphatic diisocyanates.

6. A process according to claim 1, wherein the diisocyanate is a mixture of more than two cycloaliphatic diisocyanates.

7. A process according to claim 1, wherein the diisocyanate is a mixture of more than two aromatic diisocyanates.

* * * * *